April 1, 1941.                R. ETZKORN                2,236,939
                              ROTARY CUTTER
                           Filed Jan. 8, 1938
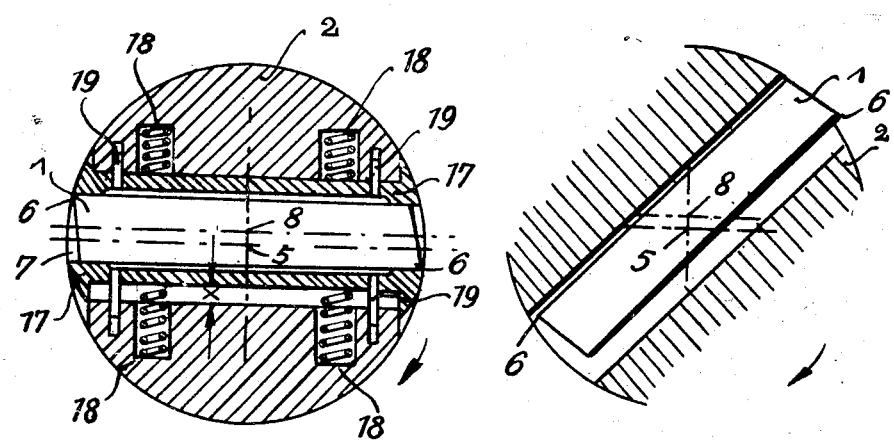
Fig. 1         Fig. 4
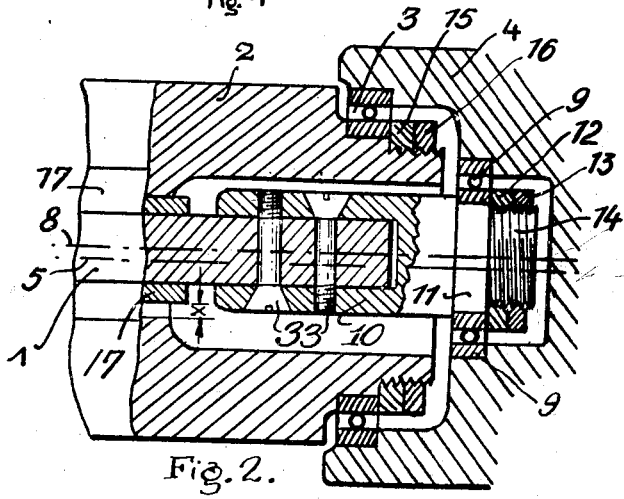  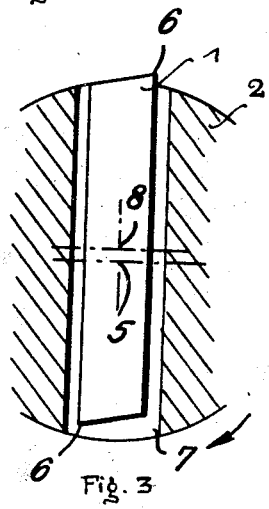
Fig. 2                               Fig. 3
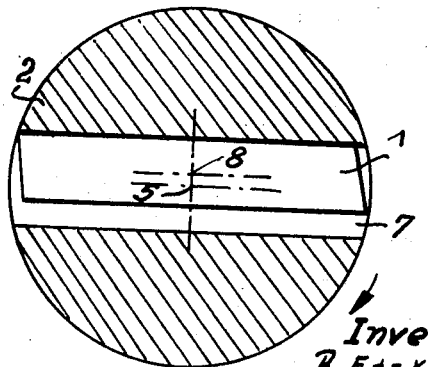
Fig. 5
Inventor:
R. Etzkorn
by
Atty Patented Apr. 1, 1941

2,236,939

UNITED STATES PATENT OFFICE 2,236,939

ROTARY CUTTER

Rudolf Etzkorn, Murg, Baden, Germany

Application January 8, 1938, Serial No. 184,080
In Germany January 11, 1937

2 Claims. (Cl. 83—6)

This invention relates to a cutter for machining smeary or sticky substances such as, for example, substances containing cellulose or cellulose derivatives.

It is an object of my invention to improve the action of the cutter in the treatment of such materials having high adhesion.

More particularly, it is the object of the invention to remove the chips or other deposits sticking to the cutting edges of the knives, due to the high adhesion of the substances to be treated.

A further object of the invention is to prevent the cutting edges of the cutter from vibration in the cutting action.

With these and further objects in view, my novel cutter comprises a rotating knife holder or cylinder, one or more knives in the knife holder and means adapted to remove the chips from the cutting edges after each cutting action.

Further objects and particulars of the invention will be clear from the following detailed description in connection with the accompanying drawing, showing by way of example and schematically some embodiments of my invention, viz.—

Fig. 1 is a cross section of one form of my cutter.

Fig. 2 is a fragmentary longitudinal section of the cutter shown in Fig. 1.

Figs. 3 to 5 are fragmentary cross sections according to Fig. 1, indicating the different phases of the movement of the cutter.

Identical reference numerals denote identical parts in the different figures.

Referring now to the drawing in greater detail, and first to Figs. 1 and 2, it will be seen that a cylindrical knife holder 2 is mounted for rotation about its center axis 5, by ball bearings 3 arranged at both ends of the cylinder 2, and held in their position by nuts and counter nuts 15 and 16, in stationary supports 4, one of which is indicated at the right hand end of the cylinder 2 in Fig. 2. A slide 1 having knife edges 6 at both ends, is movable in a slot 7 of the cylinder 2 and mounted for rotation about an axis 8 radially displaced with respect to the axis 5 of the cylinder 2, by ball bearings 9 arranged at both of its ends, in the same supports 4 as the cylinder. Advantageously, an intermediate member 10 is provided to carry the knife 1, by screws 33, and the inner ring of the ball bearing 9 which is mounted on a projection 11 of the member 10, by means of nuts and counternuts 12 and 13, engaging the thread 14. The knife 1 thus is caused to reciprocate in the longitudinal slot 7 of the cylinder 2 which is wider than the knife 1 by an amount $x$ corresponding at least to twice the amount of eccentricity between the center axes of the knife and the cylinder, 5 and 8, respectively, as best shown in Fig. 3. The cylinder 2 is rotated in the direction indicated by the arrow, (Fig. 1) whereby the knife 1 is rotated in the same direction, but about its axis 8. Starting out from the vertical position of the knife according to Fig. 3, the knife after one-eighth of one revolution comes into the position indicated in Fig. 4. After a quarter of one revolution, referring to the original position according to Fig. 3, the knife 1 assumes the position shown in Fig. 5. It will be seen from Figures 3 and 5 that the gaps or interstices on both sides of the rotating knife 1, between the knife 1 and the slot 7 the cylinder 2, change in width, while the upper edge 6 of the knife gradually moves from the position according to Fig. 3 into the slot 7 of the cylinder in which it disappears entirely after a revolution through 90°.

Now, in order to strip off the smeary substances occurring at the knife blade 1, in the cutting action, stripping-off or slide members 17 acted upon by springs 18, are provided on both sides of the knife surface and advantageously held in their positions by means of guiding pins 19. The smeary residues collected at the cutting faces of the knife 1 are thus stripped off from the cutting knife edges by these slide members 17 and the knife is cleaned automatically after each cutting action.

The knife holder 2 is advantageously made in two symmetrical shell parts to facilitate its assemblage with the slide members 17 and the knife 1 and member 10, said shells being held together by the nuts and counternuts 15 and 16, respectively.

While I have herein shown and described certain preferred embodiments of my invention, I wish it to be understood that I do not confine myself to all the precise details herein set forth by way of illustration, as modification and variation may be made without departing from the spirit of the invention or exceeding the scope of the appended claims.

I claim:

1. In a rotary cutter in combination, a rotary cylinder, at least one knife slidably mounted in a slot of said cylinder which is wider than said knife, means adapted to support said knife for rotation about an axis radially displaced against the axis of said cylinder, and resilient means adapted to close the variable interstices between said slot and said knife and to strip off the chips from the knife edges.

2. In a rotary cutter in combination a rotary knife body comprising at least one cutting face, a slide member associated to and movable along each cutting face to scrape off deposits from said cutting face, resilient means adapted to press said slide member against said cutting face and means adapted to move said slide member in dependence on the rotation of said cylinder.

RUDOLF ETZKORN.